United States Patent Office 2,955,956
Patented Oct. 11, 1960

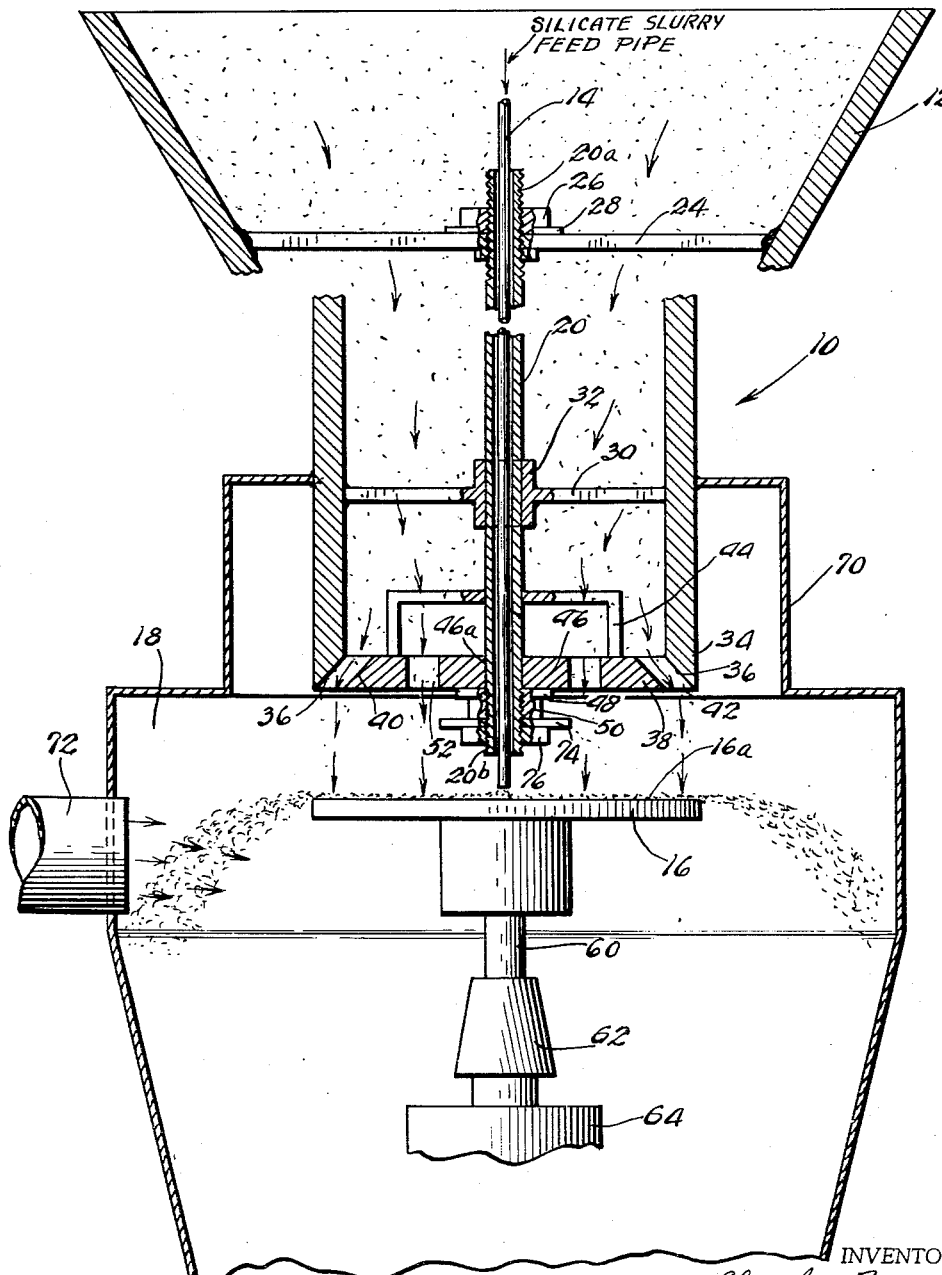

2,955,956

PROCESS AND APPARATUS FOR COATING GRANULES

Charles Baugh, Crystal Lake, and Richard A. Patton, Woodstock, Ill., assignors to Morton Salt Company, Chicago, Ill., a corporation of Illinois Filed May 15, 1957, Ser. No. 659,290

6 Claims. (Cl. 117—100)

This invention relates to a method and apparatus for applying a slurry or solution of an additive material to granular substances. Although this invention is herein described in connection with the coating of table salt with alkaline earth metal silicate anticaking additives it should be undertsood that the apparatus and method may be used to apply many different types of additives to the granular salt.

Various materials have been added to granular table salt in order to protect the salt granules from humid atmospheres in which their tendency to cake and agglomerate is quite great. In the past these additive materials usually have been mixed with the table salt in a dry state. The dry blending of the additive materials with the granular salt, however, has not been completely satisfactory, because the additive materials tended to segregate rather easily from the salt in normal use and the resulting salt has a tendency to dust. In our copending application Serial No. 654,925, filed April 24, 1957, we have disclosed a process for coating salt granules with liquid suspensions of silicate additives. The process there disclosed has been found to be very satisfactory and the salt treated in accordance therewith is protected against the adverse effects of humid atmospheres and the product does not have a tendency to dust. The present invention involves a process and apparatus for treating a solid granular material such as salt with a liquid in order to thoroughly coat the granules with the liquid.

It is one particular object of this invention to provide a method and apparatus for the blending of a granular substance and a liquid additive material whereby the additive material will be uniformly coated on the granules.

It is another object of this invention to provide a method and apparatus for applying an anticaking additive to granular table salt whereby subsequent segregation of the additive and salt will be prevented.

It is still another object of this invention to provide a very efficient and compact apparatus for the blending of granular salt with certain additive materials.

It is a further object of this invention to provide a method and apparatus for uniformly applying a liquid suspension of a finely divided anticaking additive material to relatively dry granular table salt.

Other objects may be seen and a fuller understanding of the invention may be had by referring to the following description and claims taken in conjunction with the accompanying drawing.

In accordance with this invention a method and apparatus for the coating of granular salt material with a slurry of finely divided additive material is provided. In one embodiment the slurry of additive material is caused to move rapidly across a surface in the form of a film, and a stream of relatively dry granular salt material is flowed upon the moving film of slurry. The additive slurry is picked up by and coated upon the individual granules of salt and the thus coated salt is subsequently dried.

The preferred apparatus for accomplishing the objectives of this invention comprises a table, means for effecting rapid rotation of that table, means for flowing onto the surface of that table a slurry of additive material, and a means for delivering relatively dry granular salt onto said table whereby the liquid suspension is moved rapidly into intimate contact with and coated upon the salt crystals and the thus coated salt crystals are thrown from the table by centrifugal force and permitted to fall from the surface of said rotating table. It is preferred that means be provided for drying this product as it is falling from the rotating table. Agglomeration of coated salt granules is avoided because the rotating table effectively disperses discrete particles in a moving gaseous drying medium where the surface moisture is evaporated and separated from the crystals before they recontact other crystals.

In the drawing, the single figure is a broken side elevation view of the apparatus constructed in accordance with one embodiment of this invention.

Referring more particularly to this drawing, a blending apparatus 10 is provided which includes a bottomless hopper 12, an additive slurry feed pipe 14, a rotatable blending table 16 and a drying chamber 18. The additive material feed pipe 14 extends through the center of hopper 12 and is adapted to deliver slurry to the surface of table 16 at approximately its center of rotation. Pipe 14 is carried within and protected by cylinder 20 which is threaded at its upper and lower extremities 20a and 20b respectively. The upper extremity 20a of cylinder 20 extends through upper mounting bracket 24 which is connected to the interior walls of hopper 12. A positioning nut 26 threadably engages the upper extremity 20a of cylinder 20 and in cooperation with washer 28 and mounting bracket 24 is adapted to maintain cylinder 20 in the desired position of vertical adjustment with respect to hopper 12. As will later be seen, adjustment of the salt flow is effected by positioning nut 26.

Below mounting bracket 24 and also attached to the walls of hopper 12 is positioning bracket 30 which carries a cylindrical collar 32 which is adapted to receive cylinder 20. Cylinder 20 is maintained in proper orientation within hopper 12 by the cooperation of mounting bracket 24 and positioning bracket and collar 30 and 32. Collar 32 permits vertical sliding movement of cylinder 20 but prevents any horizontal movement of that cylinder.

The lower portion 34 of hopper 12 is preferably annular in cross section and the edges 36 of the hopper wall are tapered downwardly from the inside to the outside.

An annular ring 38 which has a central aperture is disposed horizontally within the lower portion 34 of the hopper adjacent edge 36. The peripheral edge 40 of ring 38 is tapered from top to bottom, preferably corresponding to the taper of circumjacent hopper wall edge 36, and is spaced uniformly from hopper wall edge 36 resulting in annular apetrure 42. It may be seen that the size of annular aperture 42 may be adjusted by vertical movement of ring 38 relative to hopper 12. Ring 38 is connected to cylinder 20 by means of spider bracket 44, the arms of which extend radially outward and vertically downward within hopper 12.

A spacer ring 46 is carried on the lower end of cylinder 20 and is disposed horizontally within the central aperture of ring 38. A central hole 46a in spacer ring 46 is adapted to receive the lower end of cylinder 20, and spacer ring 46 is maintained in position on cylinder 20 by means of washer 48 and nut 50, the latter threadably engaging the lower threaded extremity 20b of cylinder 20.

Ring 46 is preferably spaced uniformly along its periphery from circumjacent ring 38 resulting in annular aperture 52. The size of annular aperture 52 may be altered by substituting a larger or smaller ring for ring 46.

As previously indicated, the vertical movement of ring 38 with respect to tapered edge 36 of hopper 12 results in the size of opening 42 being changed. By adjusting nut 26 such that cylinder 20 and rings 38 and 46 carried thereby are raised, annular opening 42 is decreased in size. By lowering cylinder 20 by means of positioning nut 26, opening 42 may be enlarged.

Table 16 as shown in the illustrated embodiment is substantially circular, although its exact shape is relatively unimportant for the purposes of this invention. The surface 16a of table 16 is preferably flat although quite satisfactory results may be obtained with tables having a surface that is concave or convex in shape. Thus the surface 16a may be termed substantially flat to include any such slight variations such as dish-shaped or even dome-shaped.

Table 16 may be connected by means of a shaft 60 and a chuck 62 to a high speed motor 64, which is adapted to impart high velocity rotation thereto. It is preferred that the velocity of rotation of table 16 be in the neighborhood of 4000 to 7000 revolutions per minute although the motor 64 should be capable of imparting 10,000 revolutions per minute to the table. The exact mounting of motor 64 and table 16 is not shown as it is perfectly understandable to a person skilled in the art that a variety of well known mountings are available for such a device.

A casing 70 is provided forming drying chamber 18. It is of course desirable to employ the good practices known to the art with respect to the design of this drying chamber in which surface moisture is essentially flash evaporated during pneumatic and gravitational transport of the particles through the drying region. Compactness of design may be facilitated by use of a tangential hot air or gas duct 72 which causes the particles to follow a convoluted path through the dryer, thus prolonging their exposure to the drying atmosphere.

In operation hopper 12 is adapted to receive and hold a supply of relatively dry granular table salt. A slurry of additive material is fed through pipe 14 centrally onto surface 16a of table 16. Motor 64 causes table 16 to rotate or spin at a high velocity and thus the additive slurry as it is delivered is quickly spread in a thin film on table surface 16a and is rapidly moved across this surface by centrifugal force. The relatively dry salt material is permitted to flow continuously onto table surface 16a in two annular curtains corresponding to the two annular apertures 42 and 52 formed by the cooperative positioning of rings 38 and 46 and the bottom edge 36 of hopper 12. As the slurry film moves across table surface 16a it is initially contacted by the salt flowing in an annular stream from aperture 52. This causes the slurry to intimately contact the individual granules of salt and to be coated upon these granules. The slurry and salt in intimate contact are moved together rapidly outward on the table surface 16a by centrifugal action, whereupon before reaching the edge of the table the second curtain of flowing salt which passes through annular aperture 42 is encountered. This second curtain of salt acts as a scavenger to insure the complete utilization of all of the additive slurry. The salt thus coated with the additive material is thrown or permitted to fall from the edge of table 16. As it is falling from the table edge the coated salt is subjected to the drying effects of the very warm and very dry gas which is supplied to chamber 18 by means of duct 72. It is preferred that the coated salt be substantially dry by the time it emerges from the bottom (not shown) of chamber 18 and thus agglomeration of the salt is further lessened.

In order to prevent excessive splashing of the additive slurry it is preferred that a splash plate 74 be provided adjacent the end of feed pipe 14. Splash plate 74 may be attached to the lower end of cylinder 20 adjacent the end of feed pipe 14 by means of a locking nut 76. The lower end of pipe 14 preferably extends to within ¼" of the center of the table to further minimize splashing.

The slurry which is fed through pipe 14 is preferably a suspension containing 10% to 16% of an alkaline earth metal silicate gel, 3% to 7% of dissolved salt (NaCl) and 77% to 83% water. The alkaline earth metal silicates are preferably silicates of calcium and magnesium. A typical suspension consists of 12.7% alkaline earth metal silicates, 5.6% sodium chloride and 81.7% water. This material is added to the salt in quantities of from ½ to 1½% based upon the weight of the dry salt.

The apparatus as illustrated is extremely compact. Rotating disc or table 16 may in general be from 3 to 9 inches in diameter. The annular salt feed apertures 42 and 52 are preferably in the range of ⅛" to ¼" wide. The normal operating capacity of the apparatus is approximately 18½ tons per hour of additive coated salt.

It will be apparent from the foregoing that a method and appartus for applying an anticaking additive to granular table salt has been provided which is very effective in uniformly coating the individual granules of salt and in preventing subsequent segregation of additive material from the salt material. The apparatus is very simple, very effective, and extremely compact. This apparatus is also well suited for the coating of a variety of granular materials other than table salt, such as the coating of plant seeds with fungicides, insecticides and the like.

Although the invention has been described with a certain degree of particularity, it is understood that the present disclosure has been made only by way of example, and that numerous changes in the details of construction, the combination and arrangement of parts and the sequence of steps in the procedure may be resorted to without departing from the spirit and scope of the invention as hereinafter claimed.

What is claimed is:

1. An apparatus for coating granular salt material with a slurry of additive material comprising a relatively flat supporting surface, means operatively connected to said surface for effecting rapid rotation thereof, means for delivering a slurry of additive material onto said surface at approximately the axis of rotation thereof, means for flowing a stream of granular salt onto said surface in a substantially continuous curtain surrounding said axis of rotation, whereby a film of said additive slurry is rapidly moved across said surface into intimate contact with said salt crystals, and means for flowing a second stream of salt onto said surface in a substantially continuous curtain surrounding said first stream of salt, whereby any additive slurry which has not been coated upon the salt of said first stream will be picked up by and coated upon the salt of said second stream.

2. An apparatus for coating granular salt material with a slurry of additive material comprising a relatively flat supporting surface, means operatively connected to said surface for effecting rapid rotation thereof, means for delivering a slurry of additive material onto said surface at approximately the axis of rotation thereof, means for flowing a stream of granular salt onto said surface in a substantially continuous curtain surrounding said axis of rotation, whereby a film of said additive slurry is rapidly moved across said surface into intimate contact with said salt crystals, means for flowing a second stream of salt onto said surface in a substantially continuous curtain surrounding said first stream of salt, whereby any additive slurry which has not been coated upon the salt of said first stream will be picked up by and coated upon the salt of said second stream, and means for subsequently drying said thus coated granular salt material as it is falling from said surface.

3. An apparatus for coating granular material with an additive material which comprises a table, a power actuated means operatively connected to said table for imparting rotation thereto, means for delivering a liquid suspension of a finely divided additive material to said table at approximately its center of rotation, a second delivery means for delivering granular material to said table in a curtain substantially surrounding the point at which the liquid suspension is delivered, a third delivery means for delivering granular material to said table in a curtain substantially surrounding said first curtain, whereby said liquid suspension of finely divided material is moved into intimate contact with and coated upon said granular material, and the thus coated granular material is permitted to fall from said surface, and means for drying said thus coated granular material as it falls from said surface.

4. A method for coating granular salt material with an additive material which comprises delivering a liquid slurry of additive material centrally to a surface rotating in a substantially horizontal plane about a substantially vertical axis flowing said granular salt material on to said surface in two annular streams one circumjacent the other and both surrounding the point of delivery of said additive material, whereby substantially all of the slurry of additive material is brought into intimate contact with and coated upon said salt material, discharging the coated salt material from an edge of said surface, and drying said coated salt material as it is falling from said surface.

5. A method for coating granular salt material with a liquid additive which comprises delivering said liquid additive centrally to a surface rotating in a substantially horizontal plane about a substantially vertical axis, continuously flowing said granular salt material in an annular stream on to said surface surrounding the point of delivery of said additive material, whereby said additive material is brought into intimate contact with and coated upon said granular salt material, discharging the coated salt material from an edge of said surface, and drying said mixed material as it is falling from said surface.

6. A method for coating granular sodium chloride salt with an alkaline earth metal silicate additive material which comprises delivering a liquid slurry of the alkaline earth metal silicate additive centrally to a surface rotating in a substantially horizontal plane about a substantially vertical axis, continuously flowing relatively dry granular sodium chloride salt in an annular stream onto said surface surrounding the point of delivery of said additive slurry whereby the liquid slurry of additive is brought into intimate contact with and coated upon said granular salt, discharging the coated salt from an edge of said surface, and drying said coated salt as it is falling from said surface.

References Cited in the file of this patent

UNITED STATES PATENTS

| | | |
|---|---|---|
| 1,157,935 | Gray | Oct. 26, 1915 |
| 1,294,909 | Howell | Feb. 18, 1919 |
| 1,915,201 | Ragg | June 20, 1933 |
| 2,396,689 | Davis | Mar. 19, 1946 |
| 2,658,049 | Adams | Nov. 3, 1953 |
| 2,660,541 | Rinkenbach | Nov. 24, 1953 |
| 2,754,155 | Kempthorne | July 10, 1956 |
| 2,768,899 | Waldo | Oct. 30, 1956 |